US011650938B2

(12) United States Patent
Bisa et al.

(10) Patent No.: US 11,650,938 B2
(45) Date of Patent: May 16, 2023

(54) DEVICE-CAPABILITY-BASED LOCKING KEY MANAGEMENT SYSTEM

(71) Applicant: Dell Products L.P., Round Rock, TX (US)

(72) Inventors: Rama Rao Bisa, Sobha (IN); Sushma Basavarajaiah, Bangalore (IN); Mukund P. Khatri, Austin, TX (US); Chandrashekar Nelogal, Round Rock, TX (US); Chitrak Gupta, Karnataka (IN); Manjunath Am, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 401 days.

(21) Appl. No.: 16/258,367

(22) Filed: Jan. 25, 2019

(65) Prior Publication Data

US 2020/0242051 A1 Jul. 30, 2020

(51) Int. Cl.
*G06F 12/14* (2006.01)
*H04L 9/40* (2022.01)
*H04L 67/30* (2022.01)
*G06F 21/78* (2013.01)

(52) U.S. Cl.
CPC ...... *G06F 12/1466* (2013.01); *G06F 12/1408* (2013.01); *G06F 21/78* (2013.01); *H04L 63/062* (2013.01); *H04L 67/30* (2013.01); *G06F 2212/1052* (2013.01)

(58) Field of Classification Search
CPC .... G06F 12/1466; H04L 63/062; H04L 67/30
See application file for complete search history.

(56) References Cited

U.S. PATENT DOCUMENTS

| 8,005,879 | B2 | 8/2011 | Bornhoevd et al. |
| 2013/0044878 | A1 | 2/2013 | Rich et al. |
| 2017/0085374 | A1* | 3/2017 | Chen ...................... H04L 9/0827 |
| 2019/0342079 | A1* | 11/2019 | Rudzitis .................. H04L 9/083 |

OTHER PUBLICATIONS

Kemp, Network Hardware Security Module (HSM), Jan. 9, 2019 [retrieved form internet Jul. 9, 2020][<URL:https://kemptechnologies.com/krel/201/files/assets/documentation/7.2/feature-descriptions/Feature_Description-Network_Hardware_Security_Module_HSM.pdf?pdf-file-view=1>] (Year: 2019).*

* cited by examiner

*Primary Examiner* — David Yi
*Assistant Examiner* — Nicholas A. Paperno
(74) *Attorney, Agent, or Firm* — Joseph Mencher (57) ABSTRACT

A device-capability-based locking key management system includes a key management system coupled to a server device via a network. The server device includes storage devices coupled to a remote access controller device. The remote access controller device identifies each of the storage devices, and then identifies a key management profile for each of the storage devices. A first key management profile identified for at least one first storage device is different from a second key management profile identified for at least one second storage device. The remote access controller device then uses the respective key management profile identified for each of the storage devices to create a respective key management sub-client for each of the storage devices, and each respective key management sub-client communicates with the key management system to provide a locking key for its respective storage device.

17 Claims, 8 Drawing Sheets

DEVICE-CAPABILITY-BASED LOCKING KEY MANAGEMENT SYSTEM

BACKGROUND

The present disclosure relates generally to information handling systems, and more particularly to the management of locking keys for different devices in an information handling system based on the capabilities of those devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems in datacenters, may employ enhanced security by locking managed devices within the server system with device locking keys. For example, for many server systems in datacenters, network-based key management systems have been developed to provide for the centralized management of storage device locking keys used to lock storage devices in the server systems in order to protect the data stored thereon, with the server systems configured to retrieve those storage device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system), and use those storage device locking keys to unlock storage devices in order to access the data stored thereon. However, the locking of storage devices via storage device locking keys can raise issues.

For example, server systems may include a variety of different types of storage systems/device such as a Redundant Array of Independent Disks (RAID) system controlled by a RAID controller, storage devices controlled by a Host Bus Adapter (HBA), Non-Volatile Memory express (NVMe) devices, Field Programmable Gate Array (FPGA) devices, Non-Volatile Dual Inline Memory Module (NVDIMM) devices, and/or other storage systems/devices known in the art. Any of those storage systems/devices may have different capabilities that require different locking key management policies relative to the other storage systems/devices (e.g., a RAID controller and an NVDIMM may utilize different encryption procedures based upon the manner in which those storage devices/systems are coupled to the server device). Conventional systems associate a locking key identifier for a locking key with a server device identifier (e.g., a service tag) for the server device in order to bind that locking key to that server device, which causes issues with server devices that include the different storage systems/devices requiring the different locking key management policies discussed above. For example, virtual storage devices provided on a RAID that is controlled by a RAID controller may be associated with different virtual machines that each require a unique locking key identifier/locking key pair, NVDIMMs may require locking keys for each namespace provided on the NVDIMM, and the key management policies required to retrieve locking keys and provide those locking keys to the RAID and the NVDIMMs may be different.

Accordingly, it would be desirable to provide an improved locking key management system.

SUMMARY

According to one embodiment, an Information Handling System (IHS) includes a processing system; and a memory system that is coupled to the processing system and that includes instructions that, when executed by the processing system, cause the processing system to provide a remote access controller that is configured to: identify each of a plurality of storage devices that are coupled to the at least one processing system; identify a key management profile for each of the plurality of storage devices, wherein a first key management profile identified for at least one first storage device included in the plurality of storage devices is different from a second key management profile identified for at least one second storage device; and create, using the respective key management profile identified for each of the plurality of storage devices, a respective key management sub-client for each of the plurality of storage devices that is configured to communicate with the key management system to provide a locking key for that storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
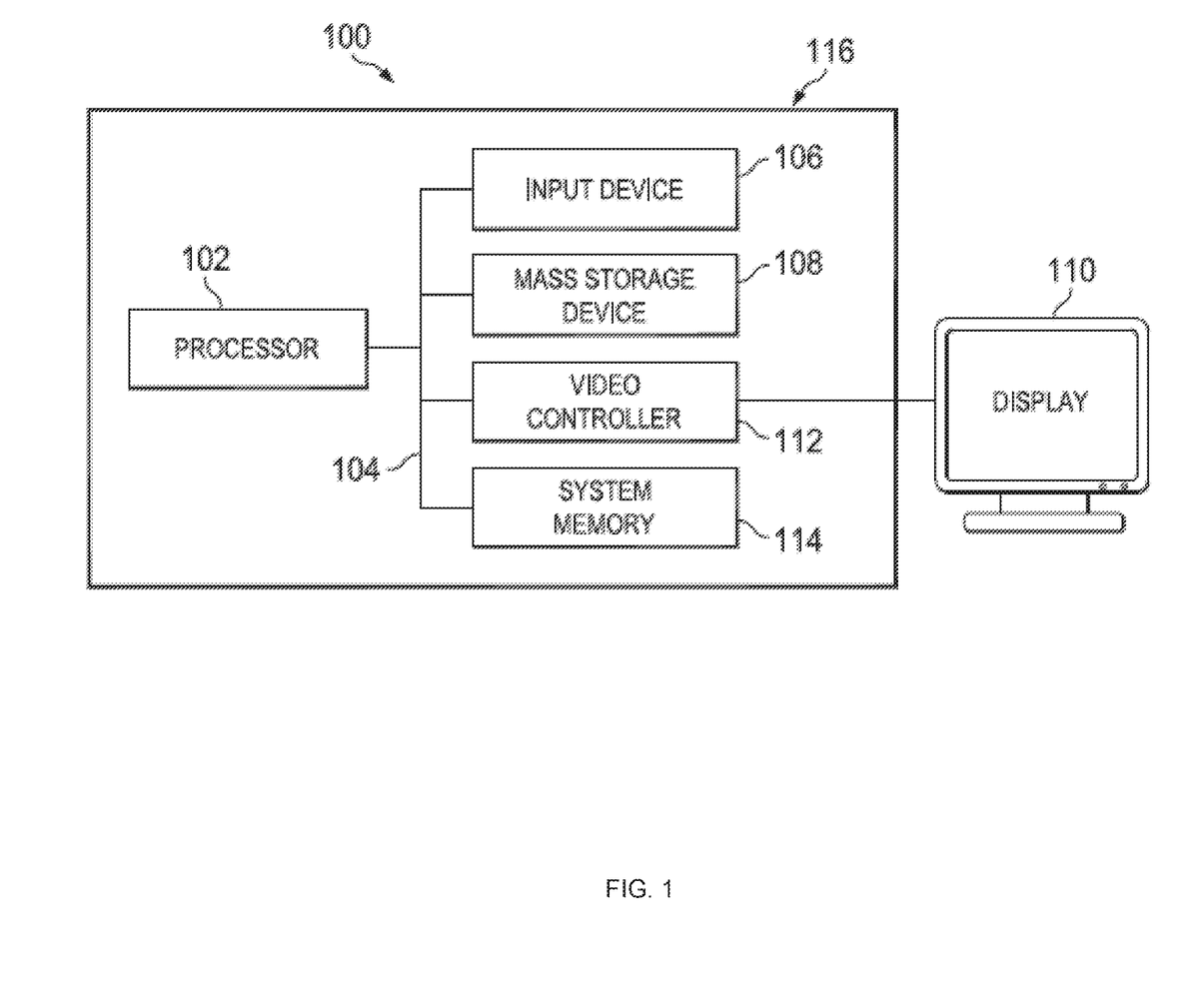
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
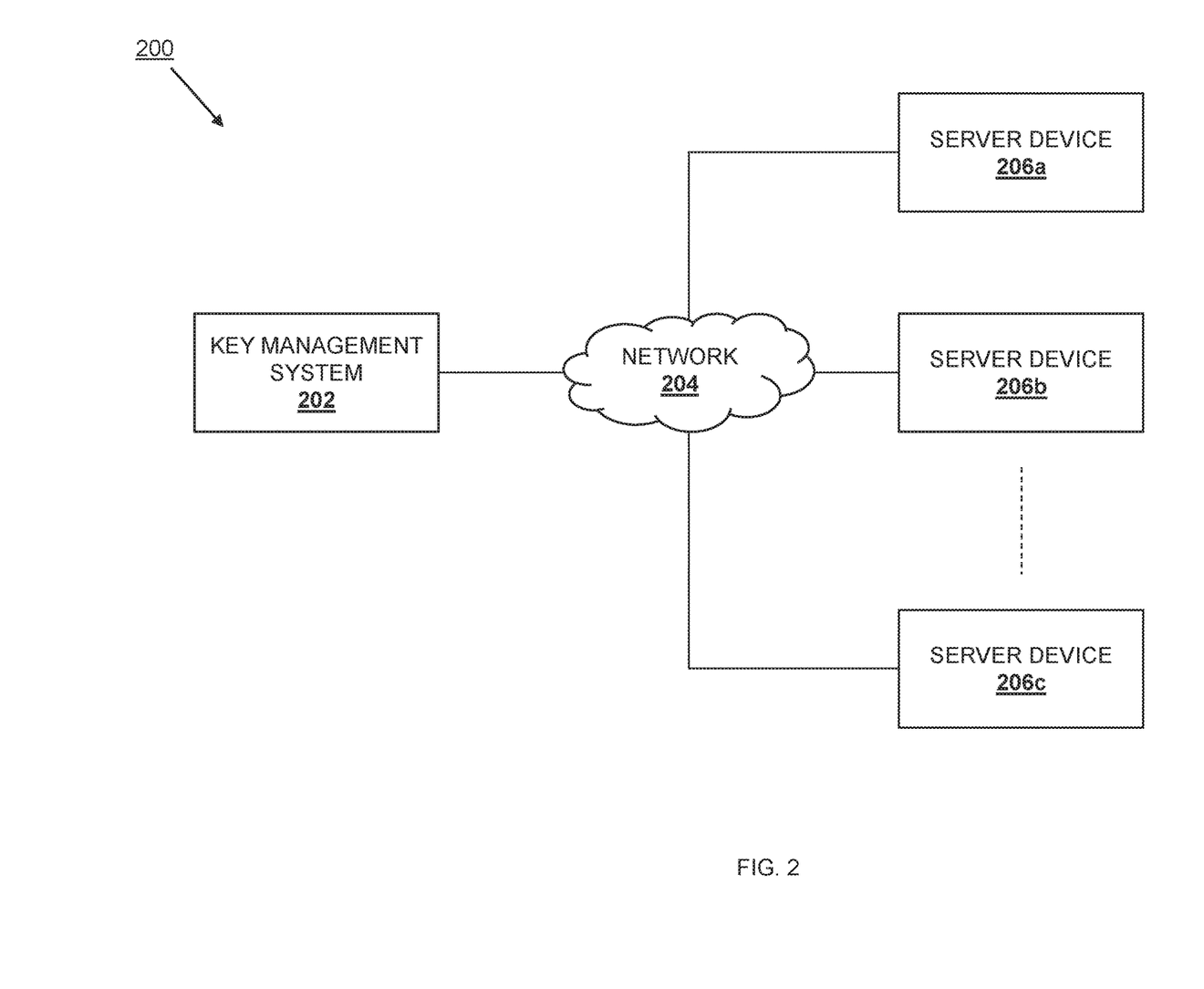
FIG. 2 is a schematic view illustrating an embodiment of a device-capability-based locking key management system.

Referring now to FIG. 2, an embodiment of a device-capability-based locking key management system 200 is illustrated. As discussed below, the device-capability-based locking key management system 200 includes a management system that may be provided by one or more of the IHSs 100 discussed above with reference to FIG. 1, and/or that may include any or all of the components of the IHS 100. In the illustrated embodiment, the management system is provided by a key management system 202 that may include one or more server devices, although other computing devices may be utilized to provide the management system while remaining within the scope of the present disclosure as well. In a specific example, the key management system 202 includes one or more server devices that are configured according to the Key Management Interoperability Protocol (KMIP), with the key management system 202 configured to operate as a KMIP server. One of skill in the art in possession of the present disclosure will recognize that the KMIP is an extensible communication protocol that defines message formats for the manipulation of cryptographic keys via server device(s) providing the key management server system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for KMIP clients to ask a KMIP server to encrypt or decrypt data, without needing direct access to the key. However, while a specific protocol is discussed herein as being utilized by the device-capability-based locking key management system 200, one of skill in the art in possession of the present disclosure will recognize that keys may be managed according to the teachings of the present disclosure via a variety of key management protocols while remaining within the scope of the present disclosure as well.

In the illustrated embodiment, the key management system 202 is coupled to a network 204 that may be provided by a Local Area Network (LAN), the Internet, and/or any other network that would be apparent to one of skill in the art in possession of the present disclosure. Furthermore, a plurality of managed systems may be coupled to the management system of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by server devices 206*a*, 206*b*, and up to 206*c*, each of which is coupled through the network 204 to the key management system 202. In embodiments in which the key management system 202 is configured to operate as a KMIP server, each of the server devices 206*a*-*c* may be configured to operate as KMIP clients. While one of skill in the art in possession of the present disclosure will recognize that the embodiment discussed below describe a datacenter including a datacenter network that couples together the key management system and the server devices, any of a variety of managed systems may be coupled to a management system via a network while operating according to the teachings of the present disclosure, and those embodiments are envisioned as falling within the scope of the present disclosure as well.

Figure 3A:
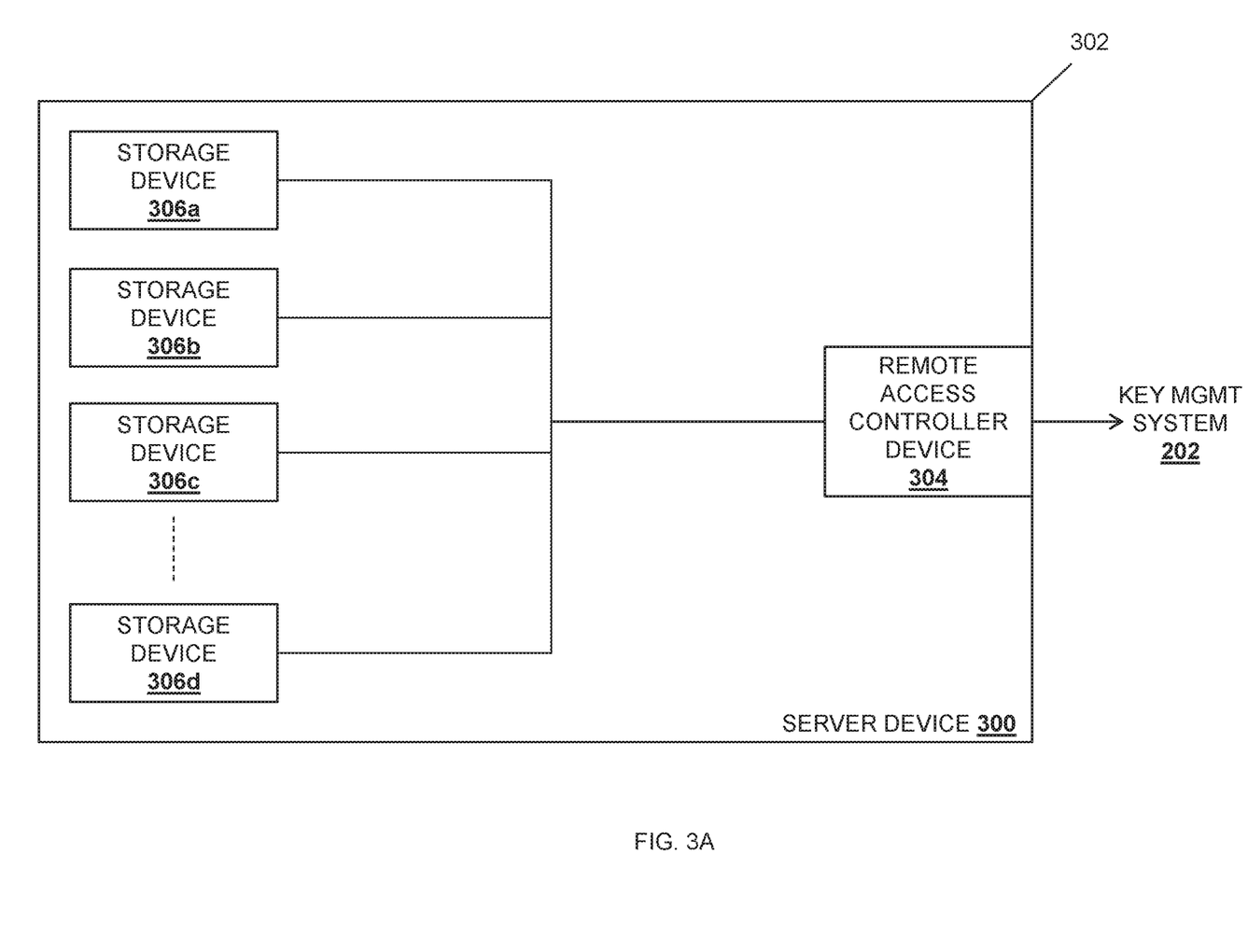
FIG. 3A is a schematic view illustrating an embodiment of a server device provided in the device-capability-based locking key management system of FIG. 2.

Referring now to FIG. 3A, an embodiment of a managed system provided by a server device 300 is illustrated. The server device 300 may be any or all of the server devices 206*a*-*c* discussed above with reference to FIG. 2 and, as such, may be provided by the IHS 100 discussed above with reference to FIG. 1, and/or may include any or all of the components of the IHS 100. In the illustrated embodiment, the server device 300 includes a chassis 302 that houses the components of the server device 300, only some of which are illustrated in FIG. 3. In the illustrated embodiment, the chassis 302 may house at least one processing system (not illustrated, but which may include the processor 102 discussed above with reference to FIG. 1) and at least one memory system (not illustrated, but which may include the memory 114 discussed above with reference to FIG. 1) that is coupled to the at least one processing system and that includes instructions that, when executed by the at least one processing system, cause the at least one processing system to provide at least one device-capability-based locking key management subsystem that is configured to perform the functionality of the device-capability-based locking key management subsystems discussed below.

For example, in the illustrated embodiment, the chassis 302 houses a remote access controller device 304 that may provide at least a portion of the device-capability-based locking key management subsystem discussed above. In a specific example, the remote access controller device 304 may be provided by, for example, an integrated DELL® Remote Access Controller (iDRAC®) available from DELL® Inc. of Round Rock, Tex., United States. As would be understood by one of skill in the art in possession of the present disclosure, remote access controller devices may provide an out-of-band management platform for server systems (e.g., via a separate expansion card, or integrated into the main circuit board as with the iDRAC® discussed above), and may operate using remote access controller resources that are separate from the server resources utilized by the server system, while providing a browser-based-interface and/or command-line-interface for allowing users to manage and monitor the server system. As discussed below, the remote access controller device 304 may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide the remote access controller that is configured to perform the functionality of the remote access controllers discussed below. Furthermore, FIG. 3 illustrates how the remote access controller device 304 provides a communication connection (e.g., via the network 204 of FIG. 2) to the key management system 202 of FIG. 2.

In the illustrated embodiment, the chassis 302 also houses a plurality of storage devices 306a, 306b, 306c, and up to 306d, each of which may be coupled to the remote access controller device 304 (e.g., via a coupling to the remote access controller processing system.) The storage devices 306a-d may be provided by a variety of different storage device types, including a Redundant Array of Independent Disks (RAID), Non-Volatile Memory express (NVMe) devices, Field Programmable Gate Array (FPGA) devices, Non-Volatile Dual Inline Memory Module (NVDIMM) devices, Self Encrypting Drives (SEDs), and/or any other storage system/device that would be apparent to one of skill in the art in possession of the present disclosure. In many of the embodiments discussed below, at least two more of the storage devices 306a-d are different from each of the other storage devices 306a-d in a manner that requires different locking key management policies in order to secure those storage devices with locking keys. In the embodiment illustrated in FIG. 3A, the remote access controller device 304 is directed connected to each of the storage devices 306a-d (e.g., via a remote access controller sideband channel) and configured to directly provide the device-capability-based locking key management functionality discussed below via that direct connection.

Figure 3B:
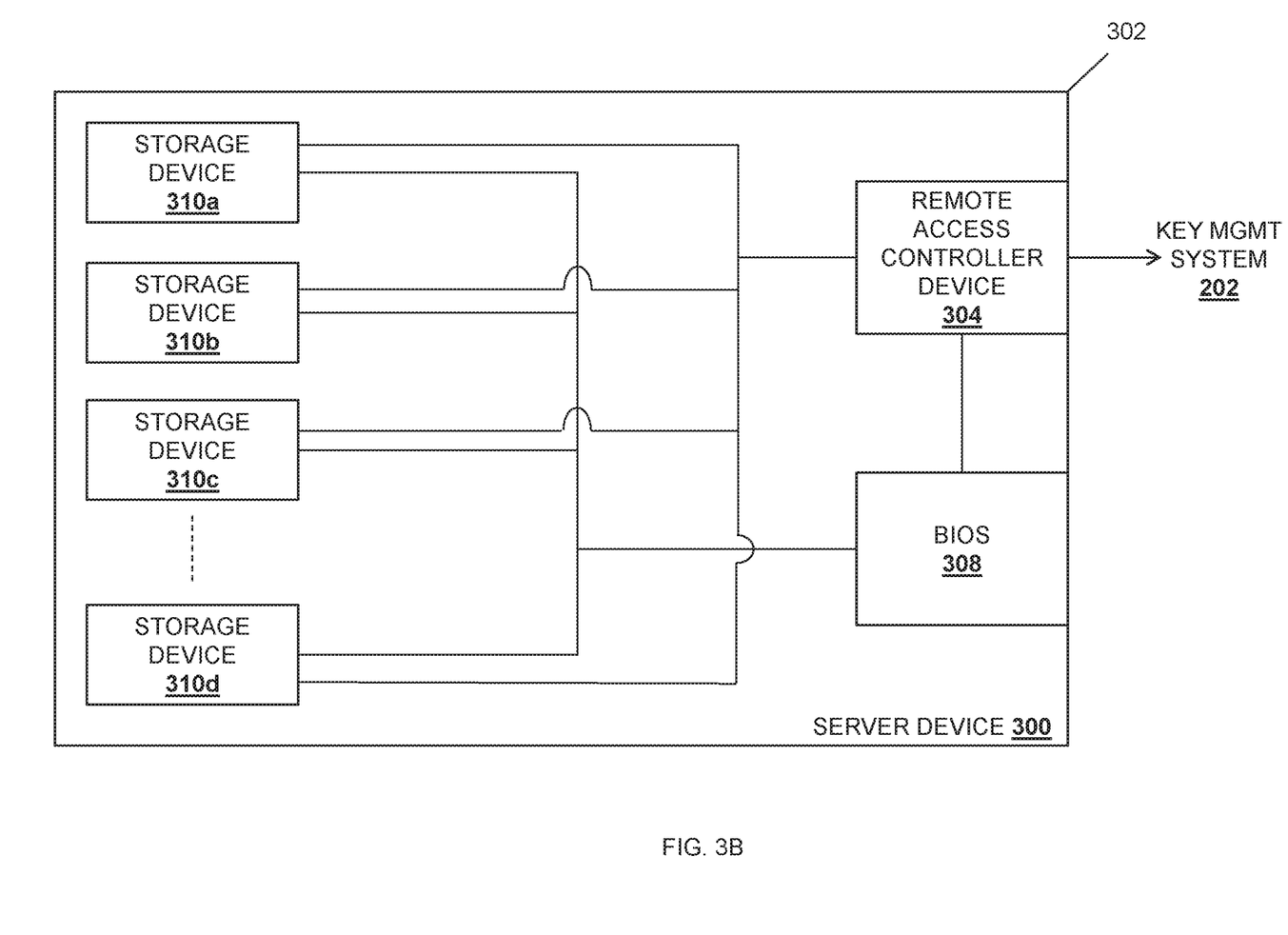
FIG. 3B is a schematic view illustrating an embodiment of a server device provided in the device-capability-based locking key management system of FIG. 2.

Referring now to FIG. 3B, the server device 300 is illustrated with the chassis 302 housing a BIOS 308 that is coupled to the remote access controller device 304 and each of the storage devices 310a, 310b, 310c, and up to 310d, and that may provide a portion of the device-capability-based locking key management subsystem discussed above. As would be understood by one of skill in the art in possession of the present disclosure, a BIOS may be provided by non-volatile firmware and may be used to perform hardware initialization during a booting process (e.g., power-on startup) for the server device 300, as well as provide runtime services for operating systems and applications running on the managed server system 300. Furthermore, while discussed as a BIOS below, one of skill in the art in possession of the present disclosure will recognize that the BIOS 308 may be provided according to the Unified Extensible Firmware Interface (UEFI) specification, which defines a software interface between an operating system and platform firmware in the server device 300, and was provided to replace the BIOS firmware interface while providing legacy support for BIOS services.

As discussed below, the BIOS 308 may include a BIOS processing system (not illustrated, but which may include the processor 102 discussed above with reference to FIG. 1 and/or components with similar processing functionality) and a BIOS memory system (not illustrated, but which may include the memory 114 discussed above with reference to FIG. 1 and/or components with similar memory functionality) that is coupled to the BIOS processing system and that includes instructions that, when executed by the BIOS processing system, cause the BIOS processing system to provide a BIOS engine that is configured to perform the functionality of the BIOS discussed below. In the embodiment illustrated in FIG. 3B, the remote access controller device 304 is connected to each of the storage devices 310a-d via the BIOS 308, and configured to provide the device-capability-based locking key management functionality discussed below in cooperation with the BIOS 308. In some embodiments, the embodiments illustrated in FIGS. 3A and 3B may be combined, with the remote access controller device 304 connected to one or more storage devices (e.g., the storage devices 306a-d) via the direct sideband channel discussed above, and the BIOS 308 connected to one or more storage devices (e.g., the storage devices 310a-d).

Figure 3C:
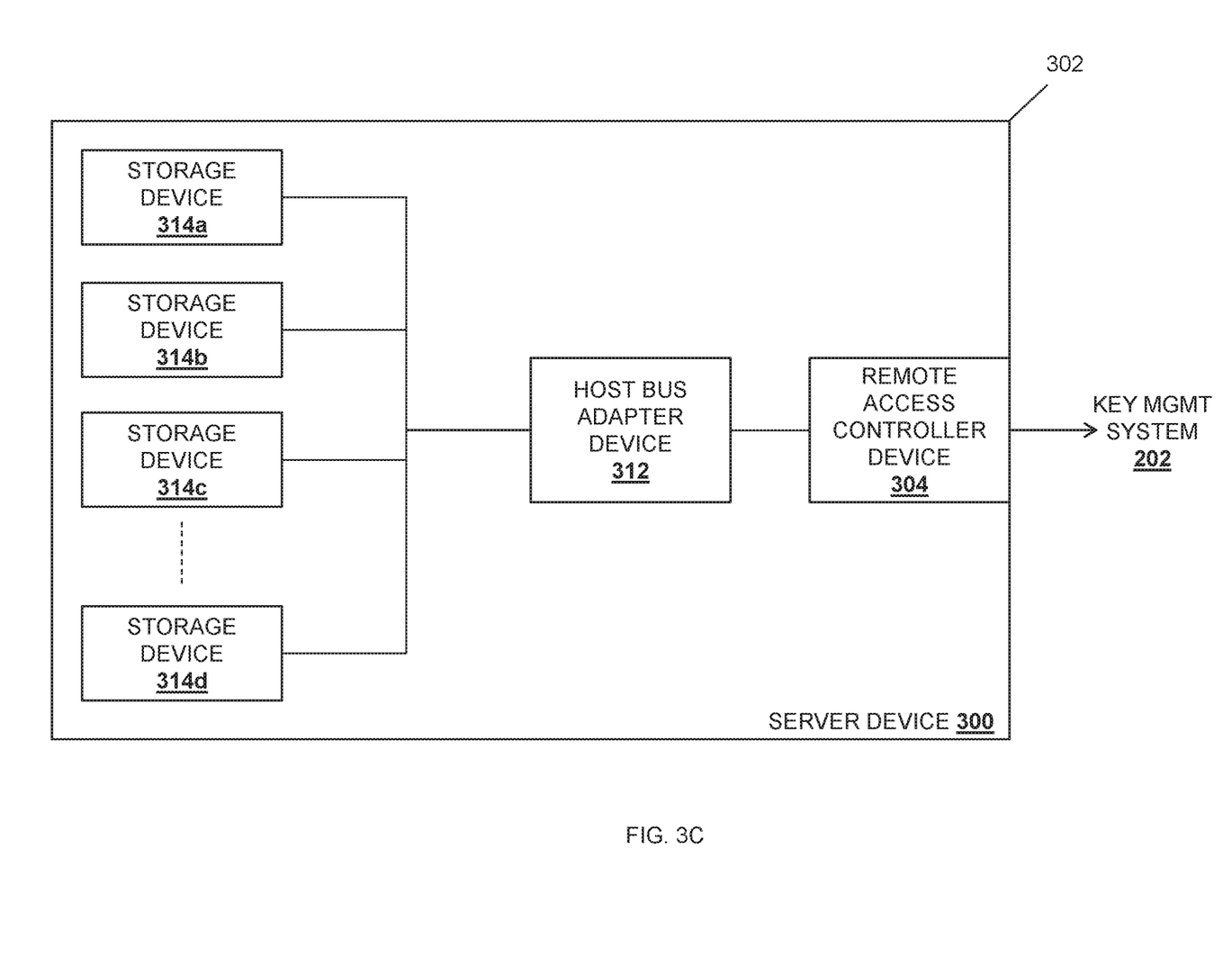
FIG. 3C is a schematic view illustrating an embodiment of a server device provided in the device-capability-based locking key management system of FIG. 2.

Referring now to FIG. 3C, the server device 300 is illustrated with the chassis 302 housing a Host Bus Adapter device 312 that is coupled between the remote access controller device 304 and storage devices 314a, 314b, 314c, and up to 314d, and that may provide a portion of the device-capability-based locking key management subsystem discussed above. In a specific example, the Host Bus Adapter device 312 may provide a connection between components of the server device 300 and the storage devices 314a-d provided by Small Computer System Interface (SCSI) storage devices, Fibre Channel storage devices, Serial AT Attachment (SATA) storage devices, and/or other storage devices known in the art.

As discussed below, the Host Bus Adapter device 312 may include a Host Bus Adapter processing system (not illustrated, but which may include the processor 102 discussed above with reference to FIG. 1 and/or components with similar processing functionality) and a Host Bus Adapter memory system (not illustrated, but which may include the memory 114 discussed above with reference to FIG. 1 and/or components with similar memory functionality) that is coupled to the Host Bus Adapter processing system and that includes instructions that, when executed by the Host Bus Adapter processing system, cause the Host Bus Adapter processing system to provide a Host Bus Adapter engine that is configured to perform the functionality of the Host Bus Adapter engines discussed below. In the embodiment illustrated in FIG. 3C, the remote access controller device 304 is connected to each of the storage devices 314a-d via the Host Bus Adapter device 312, and configured to provide the device-capability-based locking key management functionality discussed below in cooperation with the Host Bus Adapter device. In some embodiments, the embodiments illustrated in FIGS. 3A, 3B, and/or 3C may be combined, with the remote access controller device 304 connected to one or more storage devices (e.g., the storage devices 306a-d) via the direct sideband channel discussed above, and the BIOS 308 connected to one or more storage devices (e.g., the storage devices 310a-d), and/or the remote access controller device 304 connected to one or more storage devices (e.g., the storage devices 314a-d) via the Host Bus Adapter device.

Figure 3D:
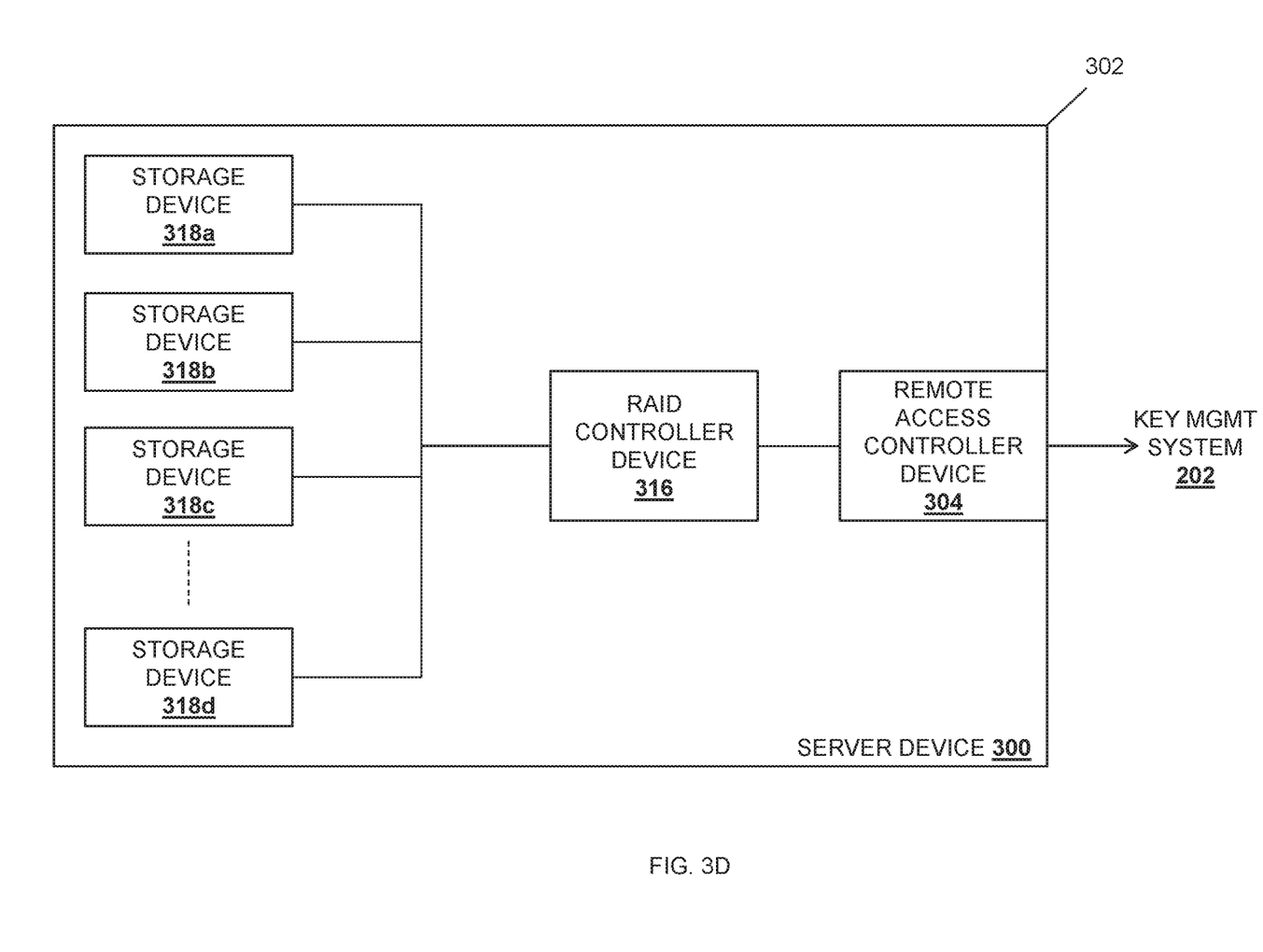
FIG. 3D is a schematic view illustrating an embodiment of a server device provided in the device-capability-based locking key management system of FIG. 2.

Referring now to FIG. 3D, the server device 300 is illustrated with the chassis 302 housing a RAID controller device 316 that is coupled between the remote access controller device 304 and storage devices 318a, 318b, 318c, and up to 318d, and that may provide a portion of the device-capability-based locking key management subsystem discussed above. In a specific example, the RAID controller device 316 may be provided by a POWEREDGE® RAID controller available from DELL® Inc. of Round Rock, Tex., United States, and may provide a disk array controller that is configured to manage physical storage devices and present them to the server device 300 (e.g., an operating system provided in the server device 300) as logical units.

As discussed below, the RAID controller device 316 may include a RAID controller processing system (not illustrated, but which may include the processor 102 discussed above with reference to FIG. 1 and/or components with similar processing functionality) and a RAID controller memory system (not illustrated, but which may include the memory 114 discussed above with reference to FIG. 1 and/or components with similar memory functionality) that is coupled to the RAID controller processing system and that includes instructions that, when executed by the RAID controller processing system, cause the RAID controller processing system to provide a RAID controller engine that is configured to perform the functionality of the RAID controllers discussed below. In the embodiment illustrated in FIG. 3C, the remote access controller device 304 is connected to each of the storage devices 318a-d via the RAID controller device 316, and configured to provide the device-capability-based locking key management functionality discussed below in cooperation with the RAID controller device 316. In some embodiments, the embodiments illustrated in FIGS. 3A, 3B, 3C, and/or 3D may be combined, with the remote access controller device 304 connected to one or more storage devices (e.g., the storage devices 306a-d) via the direct sideband channel discussed above, and the BIOS 308 connected to one or more storage devices (e.g., the storage devices 310a-d), the remote access controller device 304 connected to one or more storage devices (e.g., the storage devices 314a-d) via the Host Bus Adapter device 312, and/or the remote access controller device 304 connected to one or more storage devices (e.g., the storage devices 318a-d) via the RAID controller device 316.

While examples of different embodiments (and combinations of embodiments) of a server device have been illustrated and described, one of skill in the art will recognize that server devices may include a variety of components and/or components configurations to provide for the functionality discussed below. Furthermore, systems/device other than server devices may include devices other than storage devices that are lockable in the manner described for the storage devices below, and those devices may benefit from the teachings of the present disclosure and thus are envisioned as falling within its scope as well.

Figure 4:
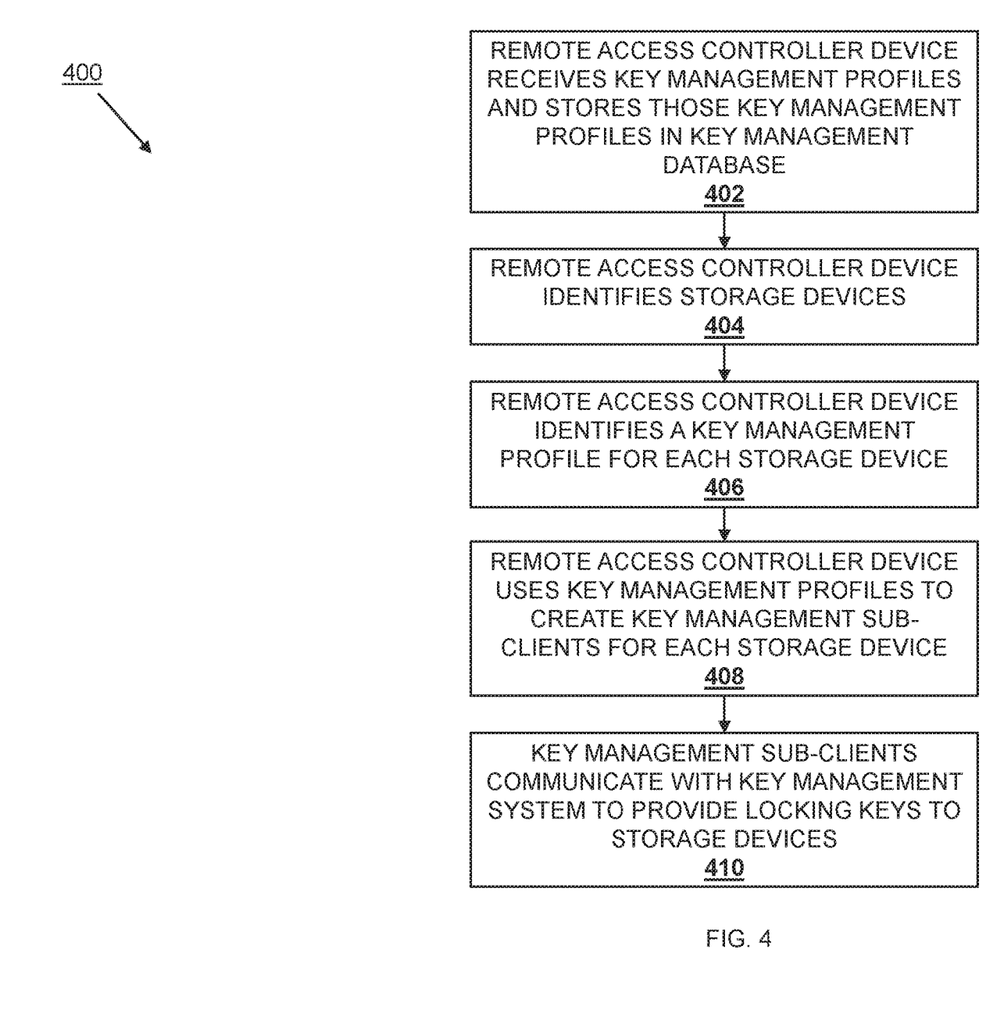
FIG. 4 is a flow chart illustrating an embodiment of a method for managing locking key based on device capabilities.

Referring now to FIG. 4, an embodiment of a method 400 for managing locking key based on device capabilities is illustrated. As discussed below, the systems and methods of the present disclosure provide for the implementation of different key management policies required by different storage systems/devices that are provided in the same server device and that have different capabilities. For example, a remote access controller in a server device may identify the different storage systems/devices in a server device and, for each of those storage systems/devices, may retrieve a respective key management policy required by that storage system device (e.g., a key management policy that operates based on the capabilities of that storage device). The remote access controller may include a key management client that is configured to manage locking keys for the server device, and the remote access controller may use each key management profile to create respective key management sub-clients in the key management client that are configured to communicate with a key management system in order to provide locking keys for their respective storage systems/devices. As such, different storage systems/devices in a server device that include different capabilities requiring different key management schemes and/or procedures may each have those different key management schemes and/or procedures implemented by a respective key management sub-client.

Figure 5:
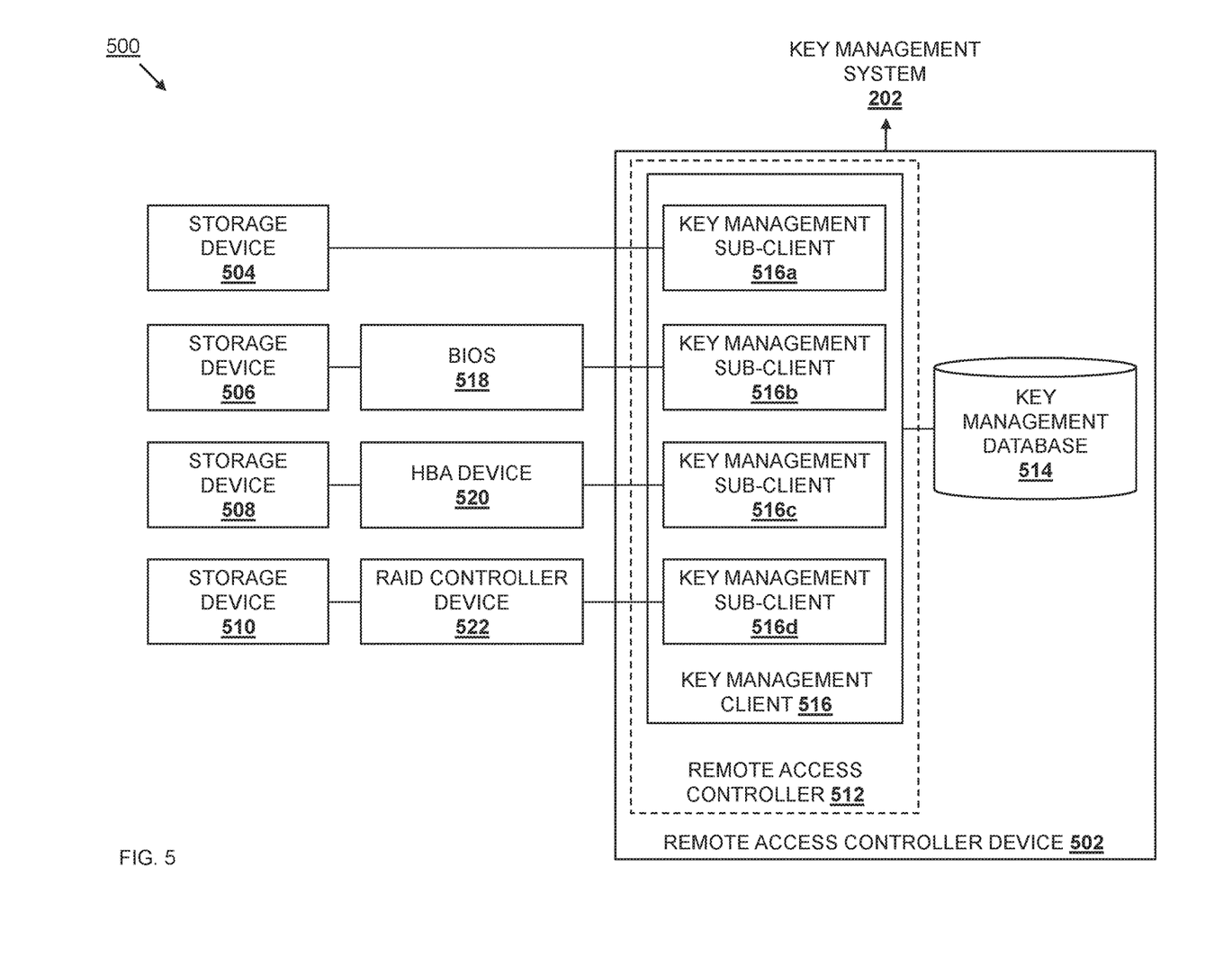
FIG. 5 is a schematic view illustrating an embodiment of managing locking key based on device capabilities in a server device provided in the device-capability-based locking key management system of FIG. 2 and during the method of FIG. 4.

The method 400 begins at block 402 where a remote access controller device receives key management profiles and stores the key management profiles in a key management database. With reference to FIG. 5, an embodiment of a server device 500 (which may be provided by different combinations of the embodiments of the server device 300 discussed above with reference to FIGS. 3A-D) is illustrated for reference to the examples described below. The server device 500 includes a remote access controller device 502 (which may be the remote access controller device 304 discussed above with reference to FIGS. 3A-3D) that is coupled to each of a plurality of storage devices 504, 506, 508, and 510, as well as to the key management system 202 (e.g., via the network 204). The remote access controller device 504 provides a remote access controller 512 (as discussed above) that is coupled to a key management database 514 and that is configured to provide a key management client 516 including the key management sub-clients 516a, 516b, 516c, and 516d discussed in further detail below. As illustrated and discussed in further detail below, the remote access controller device 502 is coupled to the storage device 504 in a manner similar to the remote access controller device 304 and storage devices 306a-d of FIG. 3A; the remote access controller device 502 is coupled to the storage device 506 via a BIOS 518 in a manner similar to the remote access controller device 304, BIOS 308, and storage devices 310a-d of FIG. 3B; the remote access controller device 502 is coupled to the storage device 508 via a Host Bust Adapter device 520 in a manner similar to the remote access controller device 304, Host Bus Adapter device 312, and storage devices 314a-d of FIG. 3C; and the remote access controller device 502 is coupled to the storage device 510 via a RAID controller device 522 in a manner similar to the remote access controller device 304, RAID controller device 316, and storage devices 318a-d of FIG. 3D.

In an embodiment, at block 402, the remote access controller device 512 may receive key management profiles for each of the storage devices 504, 506, 508, and 510, and store those key management profiles in the key management database 514. As discussed above, different storage systems and/or storage devices may have different capabilities that require different key management policies, key management schemes, and/or other key management procedures known in the art. For example, an key management system (e.g., an EKMS) may provide keys to different devices such as 1) Self Encrypting Drives (SEDs), 2) RAID controller devices (e.g., PERCs) with key management capabilities 3) Storage Controllers with data encryption capabilities 4) HBA device passthrough controllers 4) NVDIMM devices with namespaces, etc. Each device may have different requirements associated with how the key management procedures need to be undertaken. In addition, the entropy of the key for each device may vary. For example, storage controllers may provide data encryption capabilities and will require both a Key Encryption Key (KEK) and a Media Encryption Key (MEK) for its drives (with some drives requiring multiple MEKs), NVDIMM devices may enable total encryption or namespace driven encryption, HBA devices may not provide any controller specific identifiers, while other devices may provide device binding capabilities.

As such the key management procedures required to provide a locking key for the storage device 504 may be different from those required to provide a locking key for the storage device 506 (e.g., via the BIOS 518), which may be different from those required to provide a key for the storage device 508 (e.g., via the Host Bus Adapter device 520), which may be different from those required to provide a key for the storage device 510 (e.g., via the RAID controller device 522). As such, key management profiles may be created for each storage device (e.g., the storage device 504) and/or storage system (e.g., the storage device 506/BIOS 518, the storage device 508/Host Bus Adapter device 520, the storage device 510/RAID controller device 522), and provided to the remote access controller device 512 for storage in the key management database 514.

For example, a storage device manufacturer, server device manufacturer, user of the server device, and/or any other entity that would be apparent to one of skill in the art in possession of the present disclosure, may create a respective key management profile for any storage device/storage subsystem, with that key management profile defining how locking keys for that storage device/storage subsystem are to be retrieved from the key management system 200 and, in some examples, defining how those locking keys are provided to the storage device/storage system. In the specific examples below, the key management profiles are configured to be utilized by the remote access controller device 512 to generate the key management sub-clients for each different storage system/storage device, with each of those key management sub-clients configured to perform the retrieval of locking keys for their respective storage systems/storage devices, and provisioning of those locking keys to their respective storage systems/storage devices as well. For example, key management profiles may be per-storage-system/device KMIP profiles that include a set of activities that define the functionality required for cryptographic entities in the server device 500 to utilize locking keys. In a some example, standard KMIP profiles may be defined by SA-SED, Cryptographic Services, Tape Library Profiles, etc. In other examples, Outside Equipment Manufacturer (OEM) profiles may include HBA device profiles, NVDIMM device management profiles, Controller-based encryption profiles, etc. OEM profile extension functions and policies may be based on devices and may include backups, rekeying, and recovery, and may be included per device in OEM profiles.

However, one of skill in the art in possession of the present disclosure will recognize that a variety of key management profiles that allow for the locking key management functionality discussed below will fall within the scope of the present disclosure as well. As such, in some embodiments, the key management database 514 may include key management profiles for any storage system/storage device that may be utilized with the server device 500 (e.g., the key management database 514 may be populated with a table of key management profiles for any known storage system/storage device that may be provided in the server device 500, and new key management profiles for new storage systems/storage devices may be provided as updates to the key management database 514.) In other embodiments, key management profiles may be retrieved for storage systems/storage devices when they are added to the server device 500.

The method 400 then proceeds to block 404 where the remote access controller device identifies storage devices. In an embodiment, at or prior to block 404, the key management client 516 provided by the remote access controller 512 may activate a key management server key exchange profile for use in performing the method 400. In a specific example, the key management client 516 may be a KMIP client that communicates with a KMIP server provided by the key management system 202, and key exchange between the two may be governed by a Storage Array Secure Encrypted Disk (SA-SED) profile or a Cryptographic Services (CS) profile. As would be understood by one of skill in the art in possession of the present disclosure, SA-SED profiles provide for the generation of locking keys locally (e.g., by a KMIP client in the server device 500 using parameters retrieved from the storage device being locked), while providing for the storage of those locking keys at the key management system 202 (e.g., a KMIP server) with certain attributes, and the retrieval of those locking keys from the key management system 202 for use in unlocking storage devices (i.e., SA-SED profile locking key management and distribution is a KMIP client function.) As would also be understood by one of skill in the art in possession of the present disclosure, CS profiles provide for the generation and storage of the locking keys at the key management system 202 (e.g., a KMIP server), and the retrieval of those locking keys from the key management system 202 for use in unlocking storage devices (i.e., CS profile locking key management and distribution is a KMIP server function.)

As such, a user of the server device 500 may configure the server device 500 to automatically implement key management server key exchange profiles based on, for example, desired levels of security. For example, for relatively high levels of security, a user of the server device 500 may disable automatic key management server key exchange profile implementation, and may require the server device 500 to implement user configured key management server key exchange profiles. However, with automatic key management server key exchange profile implementation enabled, security may be provided by detecting available automated key management server key exchange profiles, and when those key management server key exchange profiles implement CS profiles (i.e., where locking key management and distribution is a KMIP server function), the server device 500 may retrieve a certificate from the key management system/KMIP server and determine whether the issuer of that certificate/KMIP server is trusted. If that issuer of that certificate/KMIP server is trusted, the CS profile may be implemented, while if not, an SA-SED profile may be implemented. As such, locking key management and distribution will be managed by the key management client 516/server device 500 unless the key management system 202 is trusted.

In an embodiment, at block 404, the remote access controller 512 provided by the remote access controller device 502 operates to identify storage devices in the server device 500. For example, at block 404, the remote access controller 512 may issue "get device" type commands in order to retrieve a basic inventory of the storage systems/storage devices in the server device 500. As such, at block 404, the remote access controller 512 may identify the storage device 504, the storage system including the storage device 506 and the BIOS 518, the storage system including the storage device 508 and the Host Bus Adapter device 520, and the storage system including the storage device 510 and the RAID controller device 522. In some examples, the identification of the storage systems/storage devices at block 404 may include the retrieval of information from each of those storage systems/storage devices for use in generating the locking keys for those storage systems/storage devices. While not described in detail herein, one of skill in the art in possession of the present disclosure will recognize that locking keys may be generated (e.g., by KMIP clients or KMIP servers as discussed above) for storage devices using a variety of information that may be retrieved from those storage systems/storage devices, and any of that information may be retrieved at block 404. In some embodiments, rather than (or in addition to) the identification of the storage systems/storage devices at block 404, the remote access controller 512 may operate to detect the capabilities of the storage systems/storage devices in the server device 500. Storage system/storage device capabilities may include whether the storage system/device supports encryption, what technology type the storage system device is (e.g., magnetic drive, solid state drive, tape device, memory device, etc.), what level of encryption is supported, what encryption mode is supported (e.g., local key, distributed key, device key, etc.), whether the key management is partition driven (e.g., NVDIMM device namespaces, drive partitions, etc.), whether there are virtual machine capabilities (e.g., derived from remote access controller mappings), etc.

The method 400 then proceeds to block 406 where the remote access controller device identifies a key management profile for each storage device. In an embodiment, at block 406, the remote access controller 512 provided by the remote access controller 502 uses the identities of the storage systems/storage devices determined at block 404 in order to identify key management profiles from the key management database 514. As such, at block 406, the remote access controller 512 may identify a first key management profile in the key management database 514 for the storage device 504, a second key management profile in the key management database 514 for the storage system provided by the storage device 506 and the BIOS 518, a third key management profile in the key management database 514 for the storage system provided by the storage device 508 and the Host Bus Adapter device 520, and a fourth key management profile in the key management database 514 for the storage system provided by the storage device 510 and the RAID controller device 522. As discussed below, in some embodiments, the key management procedures for each of the storage device 504, the storage system provided by the storage device 506 and the BIOS 518, the storage system provided by the storage device 508 and the Host Bus Adapter device 520, and the storage system provided by the storage device 510 and the RAID controller device 522 may be different (e.g., based on those storage system/storage device capabilities), and thus each of the first key management profile, the second key management profile, the third key management profile, and the fourth key management profile may be different (e.g., e.g., may result in the performance of different key management procedures as discussed below). However, one of skill in the art in possession of the present disclosure will recognize that, in some embodiments, multiple storage systems/storage devices may utilize the same key management procedures, and thus may have the same key management profile identified for them while remaining within the scope of the present disclosure. In embodiments in which the capabilities of the storage systems/storage devices are detected at block 404 (i.e., rather than the identities of those storage systems/storage devices), at block 406 the remote access controller 512 may operate to identify the key management policies for those devices based on their detected capabilities.

The method 400 then proceeds to block 408 where the remote access controller device uses the key management profiles to create a key management sub-client for each storage device. In an embodiment, at block 408, the remote access controller 512 provided by the remote access controller device 512 operates to use the respective key management profiles identified at block 406 to create respective key management sub-clients for the storage systems/storage devices. For example, as illustrated in FIG. 5, a key management sub-client 516a has been created in the key management client 516 for the storage device 504, a key management sub-client 516b has been created in the key management client 516 for the storage system provided by the storage device 506 and the BIOS 518, a key management sub-client 516c has been created in the key management client 516 for the storage system provided by the storage device 508 and the Host Bus Adapter device 520, and a key management sub-client 516d has been created in the key management client 516 for the storage system provided by the storage device 510 and the RAID controller device 522. In a specific example, a KMIP Master in a KMIP client provided by the remote access controller device 502 may operate to create KMIP sub-clients that provide the key management sub-clients 516a-d discussed above.

As would be understood by one of skill in the art in possession of the present disclosure, each of the key management sub-clients 516a-d may operate similarly to a conventional key management client (e.g., a KMIP client), but with the exception that each key management sub-client 516a-d provides key management functionality (e.g., the key management procedures discussed above) that is different than the other key management sub-clients 516a-d and that is configured to provision locking keys for its respective storage system/storage device. For example, key management profile may dictate the behavior of its associated key management sub-client, and the APIs defined for the key management sub-client may be made available as part of a key management common source library. As such, when a particular device profile is defined and the device capabilities are identified, the key management sub client may be invoked. These key management sub-clients may be provided as child processes of the main key management client, and their primary function may be to provide the necessary functionality for the particular device(s) corresponding to that key management profile. A KMIP sub client may have an internal mapping as per the key management profile (e.g., an API mapper) to invoke the functionalities. A profile mapper document may feed into a common program which invokes the APIs as defined by the sequence. The key management sub clients may be loaded as inventory is completed and may provide a logical distinction between functionalities and key management capabilities between devices. When a new device is introduced, a new key management sub client may be invoked and a profile (if present) may be attached to the device profile and its program. If a profile is absent, then a generic CS or SA-SED profile may be used.

For example, each key management sub-client 516*a-d* may be configured to provide KMIP client states that are configured to handle the key management procedures required by (and based on the capabilities of) their associated storage systems/devices. Thus, following block 408, a key management sub-client is created for each storage system/storage device in the server device 500 that requires different key management procedures for retrieving and/or utilizing locking keys.

The method 400 then proceeds to block 410 where the key management sub-clients communicate with a key management system to provide locking keys to their storage devices. In an embodiment, at block 410, any or all of the key management sub-clients 516*a-d* may operate to communicate with the key management system 202 in order to provide locking keys to their respective storage systems/ storage devices. For example, the key management sub-client 516*a*/storage device 504 combination in the server device 500 of FIG. 5 provides an example of the storage devices 306*a-d* that receive locking keys and locking key commands directly from the remote access controller device 304 of FIG. 3A. For example, the remote access controller device 502 may have direct access (e.g., via a sideband channel) to the storage device 504 provided by an NVMe drive. At block 410, the key management sub-client 516*a* may operate to retrieve a locking key for the storage device 504 through the network 204 from the key management system 202 (e.g., via key management procedures defined by the first key management profile used to create the key management sub-client 516*a*). Furthermore, the key management sub-client 516*a* may then operate to provide the locking key along with locking key commands to the storage device 504 (e.g., via key management procedures defined by the first key management profile used to create the key management sub-client 516*a*).

As would be understood by one of skill in the art in possession of the present disclosure, the provisioning of the locking key to the storage device 504 may allow for the locking of the storage device 504, the unlocking of the storage device 504, and/or any other locking key actions known in the art. As discussed above, locking keys may be generated at the server device 500 and stored on the key management system 202, and thus in some embodiments, the key management sub-client 516*a* may perform locking key generation operations, locking key transmission operations (to transmit the locking key to the key management system 202), and locking key retrieval operations. As also discussed above, locking keys may be generated and stored on the key management system 202, and thus in some embodiments, the key management sub-client 516*a* may perform locking key retrieval operations. As such, the first key management profile used to create the key management sub-client 516*a* may provide for locking key generation functionality, client/server locking key communications (i.e., between the key management sub-client 516*a* and the key management system 202), client/storage locking key communications, and/or any other key management procedure operations that would be apparent to one of skill in the art in possession of the present disclosure.

In another example, the key management sub-client 516*b*/BIOS 518/storage device 506 combination in the server device 500 of FIG. 5 provides an example of the storage devices 310*a-d* that receive locking keys and locking key commands via the BIOS 308 of FIG. 3B. For example, the BIOS 518 may have access to the key management system 202 as well as the storage device 506 provided by an NVMe drive. At block 410, the remote access controller device 502 may not be available to perform key management procedures for the storage device 506, and the BIOS 518 may use the key management sub-client 516*b* to retrieve a locking key for the storage device 506 through the network 204 from the key management system 202 (e.g., via key management procedures defined by the second key management profile used to create the key management sub-client 516*b*). In some embodiments, the BIOS 308 may create similar key management sub clients at its level, as the information about the key management profiles may be standardized and stored in a shared memory accessible by the remote access controller device and the BIOS. As such, if the remote access controller device is not available to unlock a device, the BIOS may derive profile information and unlock that device. Furthermore, the BIOS 518 may send that locking key and those locking key commands to the storage device 506.

As would be understood by one of skill in the art in possession of the present disclosure, the provisioning of the locking key to the storage device 506 may allow for the locking of the storage device 50*b*, the unlocking of the storage device 50*b*, and/or any other locking key actions known in the art. As discussed above, locking keys may be generated at the server device 500 and stored on the key management system 202, and thus in some embodiments, the key management sub-client 516*b* may perform locking key generation operations, locking key transmission operations (to transmit the locking key to the key management system 202), and locking key retrieval operations. As also discussed above, locking keys may be generated and stored on the key management system 202, and thus in some embodiments, the key management sub-client 516*b* may perform locking key retrieval operations. As such, the second key management profile used to create the key management sub-client 516*b* may provide for locking key generation functionality, client/server locking key communications (i.e., between the key management sub-client 516*b* and the key management system 202), client/storage locking key communications via a BIOS, and/or any other key management procedure operations that would be apparent to one of skill in the art in possession of the present disclosure.

In another example, the key management sub-client 516*c*/Host Bus Adapter device 520/storage device 508 combination in the server device 500 of FIG. 5 provides an example of the storage devices 314*a-d* that receive locking keys and locking key commands from the remote access controller device 304 via the Host Bus Adapter device 312 of FIG. 3C. For example, the remote access controller device 502 may have access via the Host Bus Adapter device 520 to the storage device 508 provided by an SED. At block 410, the key management sub-client 516*c* may operate to retrieve a locking key for the storage device 508 through the network 204 from the key management system 202 (e.g., via key management procedures defined by the third key management profile used to create the key management sub-client 516*c*). Furthermore, the key management sub-client 516*c* may then operate to provide the locking key along with locking key commands via the Host Bus Adapter device 520 (e.g., via key management procedures defined by the third key management profile used to create the key management sub-client 516c) and to the storage device 506 (i.e., the Host Bus Adapter device 520 may act as a pass-through for locking keys and locking key commands generated by the key management sub-client 516c.)

As would be understood by one of skill in the art in possession of the present disclosure, the provisioning of the locking key to the storage device 508 may allow for the locking of the storage device 50b, the unlocking of the storage device 50b, and/or any other locking key actions known in the art. As discussed above, locking keys may be generated at the server device 500 and stored on the key management system 202, and thus in some embodiments, the key management sub-client 516c may perform locking key generation operations, locking key transmission operations (to transmit the locking key to the key management system 202), and locking key retrieval operations. As also discussed above, locking keys may be generated and stored on the key management system 202, and thus in some embodiments, the key management sub-client 516c may perform locking key retrieval operations. As such, the third key management profile used to create the key management sub-client 516c may provide for locking key generation functionality, client/server locking key communications (i.e., between the key management sub-client 516c and the key management system 202), client/storage locking key communications via a Host Bus Adapter, and/or any other key management procedure operations that would be apparent to one of skill in the art in possession of the present disclosure.

In another example, the key management sub-client 516d/RAID controller device 522/storage device 510 combination in the server device 500 of FIG. 5 provides an example of the storage devices 318a-d that receive locking keys and locking key commands from the RAID controller device 322 of FIG. 3D. For example, the remote access controller device 502 may have access via the RAID controller device 322 to the storage device 510 provided by an SED. At block 410, the key management sub-client 516d may operate to retrieve a locking key for the storage device 510 through the network 204 from the key management system 202 (e.g., via key management procedures defined by the fourth key management profile used to create the key management sub-client 516d). Furthermore, the key management sub-client 516d may then operate to provide the locking key to the RAID controller device 322 (e.g., via key management procedures defined by the fourth key management profile used to create the key management sub-client 516d), and the RAID controller device 322 may operate to provide that locking key and locking key commands to the storage device 510 (i.e., the RAID controller device 322 may be configured to generate the locking key commands used by the storage device 510 to perform locking key operations).

As would be understood by one of skill in the art in possession of the present disclosure, the provisioning of the locking key to the storage device 510 may allow for the locking of the storage device 510, the unlocking of the storage device 510, and/or any other locking key actions known in the art. As discussed above, locking keys may be generated at the server device 500 and stored on the key management system 202, and thus in some embodiments, the key management sub-client 516d may perform locking key generation operations, locking key transmission operations (to transmit the locking key to the key management system 202), and locking key retrieval operations. As also discussed above, locking keys may be generated and stored on the key management system 202, and thus in some embodiments, the key management sub-client 516d may perform locking key retrieval operations. As such, the fourth key management profile used to create the key management sub-client 516d may provide for locking key generation functionality, client/server locking key communications (i.e., between the key management sub-client 516d and the key management system 202), client/storage locking key communications via a RAID controller, and/or any other key management procedure operations that would be apparent to one of skill in the art in possession of the present disclosure.

Thus, systems and methods have been described that provide for the implementation of different key management policies required by different storage systems/devices that are provided in the same server device and that have capabilities. A remote access controller in a server device identifies the different storage systems/devices in a server device and, for each of those storage systems/devices, retrieves a respective key management policy required by that storage system device (e.g., based in its capabilities). The remote access controller then uses each key management profile to create respective key management sub-clients in a key management client provided by the remote access controller, with each key management sub-client configured to communicate with a key management system in order to provide locking keys for their respective storage systems/devices. As such, different storage systems/devices in a server device that requirement different key management schemes and/or procedures may each have those different key management schemes and/or procedures implemented by a respective key management sub-client Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device-capability-based locking key management system, comprising:
  a key management system; and
  a server device that is coupled to the key management system via a network, wherein the server device includes:
    a plurality of storage devices of different types; and
    a remote access controller device that is coupled to each of the plurality of storage devices, wherein the remote access controller device operates independently of an operating system provided on the server device and is coupled to the key management system via an out-of-band connection, and wherein the remote access controller device is configured to:
      identify each of the plurality of storage devices and a type of each of the plurality of storage devices;
      identify a key management profile for each of the plurality of storage devices based on the type for that storage device, wherein a first key management profile identified for at least one first storage device of a first type included in the plurality of storage devices is different from a second key management profile identified for at least one second storage device of a second type; and
      create, using the respective key management profile identified for each of the plurality of storage devices, a respective key management sub-client for each type of the plurality of storage devices, wherein each of the respective key management sub-clients operates on the remote access controller device and is configured to:
communicate, according to the respective key management profile identified for its storage device, with the key management system via the out-of-band connection to retrieve a locking key for that storage device; and
provide, according to the respective key management profile identified for its storage device, the locking key and locking key management commands directly to that storage device.

2. The system of claim 1, wherein the remote access controller device is configured to:
retrieve key management information from each of the plurality of storage devices, and wherein the respective key management sub-client for each of the plurality of storage devices is configured to use the key management information retrieved from that storage device to provide the locking key for that storage device.

3. The system of claim 1, wherein the remote access controller device is configured to:
receive each of the key management profiles identified for each of the plurality of storage devices; and
store the key management profiles in a key management database that is included in the server device.

4. The system of claim 1, wherein the server device includes:
an intermediary device coupled between the remote access controller and at least one of the plurality of storage devices, wherein at least one first key management sub-client is configured to provide the locking key and the locking key management commands to its respective storage device via the intermediary device.

5. The system of claim 1, wherein the server device includes:
an intermediary device coupled between the remote access controller and at least one of the plurality of storage devices, wherein the remote access controller device is configured to provide the locking key to its respective storage device via the intermediary device, and wherein the intermediary device is configured to provide the locking key commands to that storage device.

6. An Information Handling System (IHS), comprising:
a remote access controller processing system that operates independently of a processing system that provides an operating system for the IHS; and
a remote access controller memory system that is coupled to the remote access controller processing system and that includes instructions that, when executed by the remote access controller processing system, cause the remote access controller processing system to provide a remote access controller that is configured to:
identify each of a plurality of storage devices that are coupled to the remote access controller processing system and a type of each of the plurality of storage devices;
identify a key management profile for each of the plurality of storage devices based on the type for that storage device, wherein a first key management profile identified for at least one first storage device included in the plurality of storage devices of a first type is different from a second key management profile identified for at least one second storage device of a second type; and
create, using the respective key management profile identified for each of the plurality of storage devices, a respective key management sub-client for each type of the plurality of storage devices, wherein each respective key management sub-client operates on the remote access controller device and is configured to:
communicate, according to the respective key management profile identified for its storage device, with a key management system via an out-of-band channel to retrieve a locking key for that storage device; and
provide, according to the respective key management profile identified for its storage device, the locking key and locking key management commands directly to that storage device.

7. The IHS of claim 6, wherein the remote access controller is configured to:
retrieve key management information from each of the plurality of storage devices, and wherein the respective key management sub-client for each of the plurality of storage devices is configured to use the key management information retrieved from that storage device to provide the locking key for that storage device.

8. The IHS of claim 6, further comprising:
an intermediary device coupled to the remote access controller processing system, wherein at least one first key management sub-client is configured to provide the locking key and the locking key management commands to its respective storage device via the intermediary device.

9. The IHS of claim 8, wherein the intermediary device is provided by a Host Bus Adapter device.

10. The IHS of claim 6, further comprising:
an intermediary device coupled to the remote access controller processing system, wherein the remote access controller device is configured to provide the locking key to its respective storage device via the intermediary device, and wherein the intermediary device is configured to provide the locking key commands to that storage device.

11. The IHS of claim 10, wherein the intermediary device is provided by one of a Basic Input/Output System (BIOS) and a Redundant Array of Independent Disks (RAID) controller device.

12. A method for managing locking key based on device capabilities, comprising:
identifying, by a remote access controller device that is included in a server device and that operates independently of an operating system provided on the server device, each of a plurality of storage devices that are located in the server device and coupled to the remote access controller device and identifying a type of each of the plurality of storage devices;
identifying, by the remote access controller device, a key management profile for each of the plurality of storage devices, wherein a first key management profile identified for at least one first storage device of a first type included in the plurality of storage devices is different from a second key management profile identified for at least one second storage device of a second type;
creating, by the remote access controller device using the respective key management profile identified for each of the plurality of storage devices, a respective key management sub-client for each type of the plurality of storage devices, wherein the respective management sub-client operates on the remote access controller device;

communicating, by each key management sub-client created by the remote access controller device according to the respective key management profile identified for its storage device, with a key management system via an out-of-band connection to retrieve a locking key for that storage device; and providing, by each first key management sub-client according to the respective key management profile identified for its storage device, the locking key and locking key management commands directly to that storage device.

13. The method of claim 12, further comprising:

retrieving, by the remote access controller device, key management information from each of the plurality of storage devices, wherein the respective key management sub-client for each of the plurality of storage devices is configured to use the key management information retrieved from that storage device to provide the locking key for that storage device.

14. The method of claim 12, further comprising:

providing, by the at least one first key management sub-client created by the remote access controller device, the locking key and the locking key management commands to its respective storage device via an intermediary device coupled between the remote access controller device and that storage device.

15. The method of claim 14, wherein the intermediary device is provided by a Host Bus Adapter device.

16. The method of claim 12, further comprising:

providing, by the at least one first key management sub-client created by the remote access controller device, the locking key to its respective storage device via an intermediary device coupled between the remote access controller device and that storage device; and providing, by the intermediary device, the locking key commands to that storage device.

17. The method of claim 16, wherein the intermediary device is provided by one of a Basic Input/Output System (BIOS) and a Redundant Array of Independent Disks (RAID) controller device.

* * * * *